US010728304B2

(12) United States Patent
LaPier et al.

(10) Patent No.: US 10,728,304 B2
(45) Date of Patent: *Jul. 28, 2020

(54) REDUNDANCY CONTROL IN STREAMING CONTENT PACKAGER POOLS

(71) Applicant: Amazon Technologies, Inc., Seattle, WA (US)

(72) Inventors: Jason LaPier, Portland, OR (US); Aslam Khader, Beaverton, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/173,709

(22) Filed: Oct. 29, 2018

(65) Prior Publication Data

US 2019/0098065 A1   Mar. 28, 2019

Related U.S. Application Data

(63) Continuation of application No. 15/243,874, filed on Aug. 22, 2016, now Pat. No. 10,116,721.

(51) Int. Cl.
| *G06F 15/173* | (2006.01) |
| *H04L 29/06* | (2006.01) |
| *H04L 29/08* | (2006.01) |
| *H04L 1/00* | (2006.01) |
| *H04N 21/2343* | (2011.01) |
| *H04N 21/24* | (2011.01) |

(52) U.S. Cl.
CPC .............. *H04L 65/607* (2013.01); *H04L 1/00* (2013.01); *H04L 65/4084* (2013.01); *H04L 65/605* (2013.01); *H04L 67/10* (2013.01); *H04N 21/2343* (2013.01); *H04N 21/2407* (2013.01); *H04L 67/1002* (2013.01)

(58) Field of Classification Search
USPC ................................. 709/217, 231, 223, 226
See application file for complete search history.

(56) References Cited

U.S. PATENT DOCUMENTS

| 6,044,225 A * | 3/2000 | Spencer ................ G06F 13/124 710/52 |
| 7,363,457 B1 * | 4/2008 | Dekoning ............. G06F 3/0607 711/112 |

(Continued)

*Primary Examiner* — Jude Jean Gilles
(74) *Attorney, Agent, or Firm* — Knobbe, Martens, Olson & Bear, LLP

(57) ABSTRACT

Systems and methods are described to enable synchronized encoding of streaming audio or video content between multiple encoders, in a manner that provides for redundancy of the system to vary based on a demand for the output content. End user devices or content distribution systems can monitor how content is output on end user devices, and report such output to a content encoding system. The encoding system can then redundancy provided for streaming content based on the demand by end users. Streams that are in high demand can be processed with high redundancy among devices that provide seamlessly interchangeable content, thus reducing the likelihood of perceived failure for such streams. Streams that are in low demand can be processed with low redundancy, reducing the computing resources used to process the stream while minimizing the overall impact of a processing failure, should one occur.

20 Claims, 6 Drawing Sheets

(56) References Cited

U.S. PATENT DOCUMENTS

| | | | | |
|---|---|---|---|---|
| 8,341,624 B1* | 12/2012 | Hobbs | ............... | G06F 9/5011 |
| | | | | 709/204 |
| 8,850,607 B2* | 9/2014 | Koka | ............... | G06F 21/105 |
| | | | | 726/26 |
| 9,674,518 B2 | 6/2017 | Agrawal et al. | | |
| 9,800,903 B2 | 10/2017 | Sze et al. | | |
| 10,116,721 B1* | 10/2018 | LaPier | ............... | H04L 67/10 |
| 2008/0075163 A1* | 3/2008 | Brydon | ............... | H04N 19/196 |
| | | | | 375/240.02 |
| 2008/0211969 A1* | 9/2008 | Simon | ............... | H04H 20/18 |
| | | | | 348/725 |
| 2009/0060043 A1* | 3/2009 | Nuyttens | ............... | H04N 19/63 |
| | | | | 375/240.16 |
| 2009/0100163 A1 | 4/2009 | Tsao | | |
| 2013/0023340 A1 | 1/2013 | Lee et al. | | |
| 2013/0318519 A1* | 11/2013 | Coolidge | ............... | G06F 8/65 |
| | | | | 717/173 |
| 2015/0181215 A1 | 6/2015 | Ozawa | | |
| 2016/0066305 A1* | 3/2016 | Chae | ............... | H04J 1/02 |
| | | | | 370/330 |
| 2016/0134881 A1 | 5/2016 | Wang et al. | | |
| 2016/0301957 A1* | 10/2016 | McCarthy | ............... | H04N 19/85 |
| 2016/0301960 A1 | 10/2016 | Sze et al. | | |
| 2017/0237987 A1* | 8/2017 | Seigneurbieux | ..... | H04N 19/146 |
| | | | | 375/240.02 |
| 2018/0007397 A1 | 1/2018 | Sze et al. | | |

* cited by examiner

REDUNDANCY CONTROL IN STREAMING CONTENT PACKAGER POOLS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Service providers or content creators (such as businesses, artists, media distribution services, etc.) can employ interconnected computing devices (e.g., within data centers) to deliver content to users or clients. In some instances, these computing devices may support traditional content distribution systems, such as by creating, modifying, or distributing streaming television or radio content. In other instances, these computing devices may serve to replicate or replace prior content distribution systems. For example, data centers can provide network-based streaming video or audio content in a manner similar to traditional television or radio networks. This content is sometimes referred to as "internet television" or "internet radio," respectively. The content provided by these distribution systems (e.g., both traditional and computing network-based) may be pre-recorded, or live. Often, where computing devices are used to facilitate either traditional or network-based distribution systems, specialized software is used to replace or replicate functionality of dedicated hardware devices. For example, software applications may be used to encode and package a data stream containing live video content, thus reducing or eliminating the need for dedicated hardware to perform these functions. Because of the flexibility of software-based solutions, a single computing device may be utilized to generate content for both traditional and network-based generation systems.

DETAILED DESCRIPTION

Figure 1:
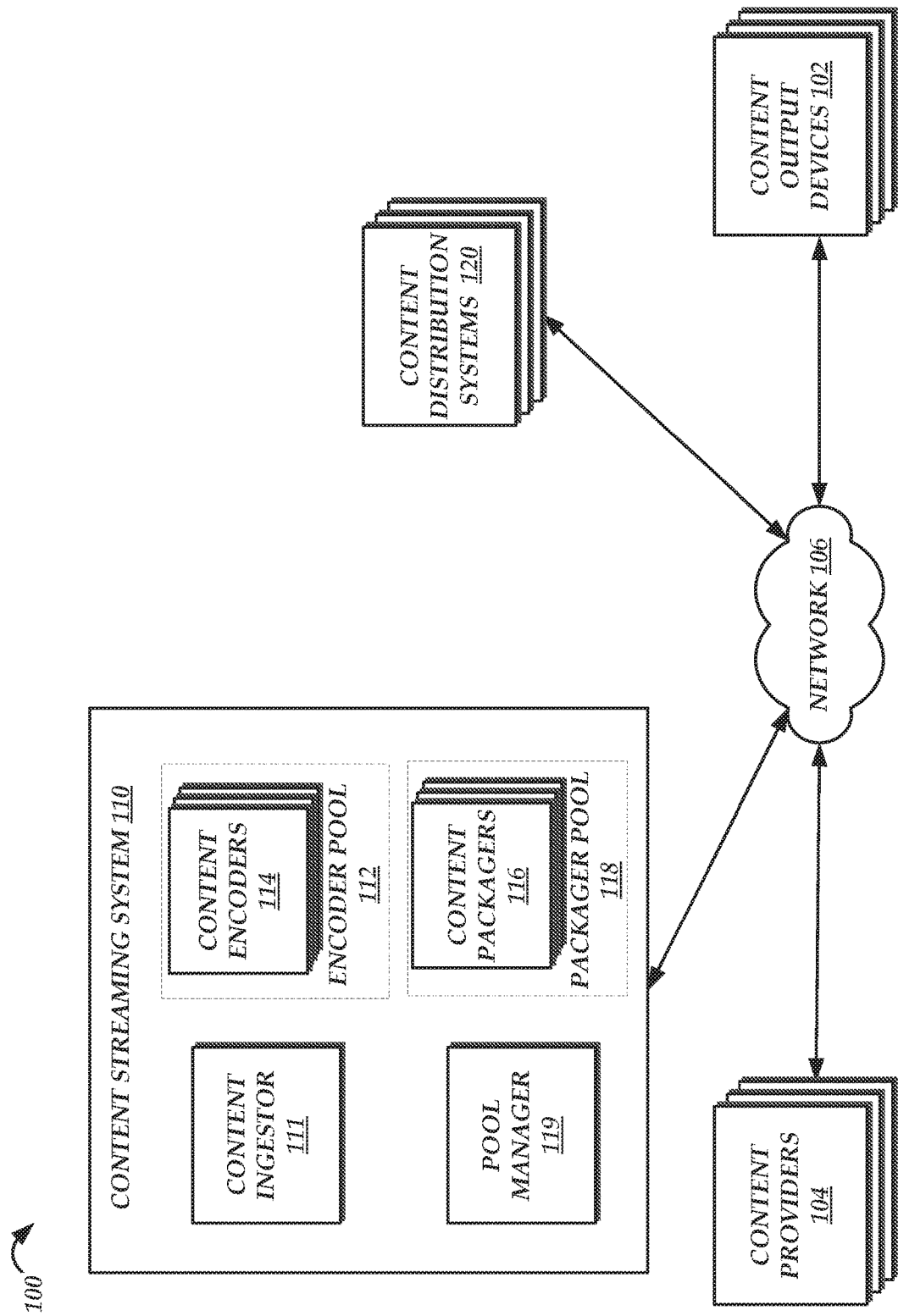
FIG. 1 is a block diagram depicting an illustrative logical network environment including content output devices, content providers, content distribution systems, and a content streaming system configured to provide encoded and packaged streaming content by use of multiple redundant or cooperative encoders and packagers organized into respective pools, as well as a pool manager to manage configuration of those pools.

Generally described, the present disclosure relates to providing streaming content over a communication network, by utilizing pools of redundant or cooperative content encoders configured according to a dynamic redundancy model, which can vary according to demand or consumption of the streaming content. More specifically, the present disclosure relates to a streaming content system that includes multiple content encoders, sometimes referred to herein as a "pool." A pool management system that can vary the number and configuration of encoders within a pool based on consumption or demand for streaming content, such that the redundancy or expected resiliency can be increased as demand for the streaming content increases. For example, aspects of the present disclosure can encode content streams characterized as popular, or in high demand, with high redundancy, such that errors or failures within individual encoders in the encoder pool result in little or no downtime from the perspective of the clients receiving requested content. Conversely, aspects of the present disclosure can encode content streams characterized as unpopular, or in lower demand, with little or no redundancy, minimizing computing resources used to encode such content. Moreover, embodiments of the present disclosure can monitor a level of consumption of a content stream to determine an appropriate level of redundancy for the stream, and modify configurations associated with an encoder pool for the content stream to achieve the appropriate level of redundancy, such that little or no human intervention is required to configure or modify encoder pool redundancy.

Illustratively, embodiments of the present disclosure can utilize virtual machines (individual instances of which can be referred to as virtual machine instances) to encode and package content streams, and to distribute such content streams to end users. A pool management system can operate to monitor consumption (or delivery) of the content streams, and to select a level of redundancy for the content stream based on that consumption. Thereafter, the pool management system can interact with the virtual machines within an encoding pool (or computing devices acting as host to the virtual machines) to modify the number or configuration of the encoder pool to implement the selected level. Level of redundancy may be measured, for example, by the number of computing devices (e.g., virtual machines) encoding content.

Illustratively, individual virtual machines may be associated with an expected failure rate (e.g., expressed as mean-time to failure or other statistical values). Additionally, an expected failure rate for a content stream being encoded by a pool of N virtual machines may be measured with respect to the expected failure rate of the virtual machines in the pool, such as by determining the probability that each virtual machine would fail concurrently. By increasing the number of virtual machines, the expected failure rate for the content stream can therefore be decreased. Additionally or alternatively, an expected failure rate may be measured by an expected downtime of a content stream due to failure. For example, where only a single device is encoding a content stream, the expected failure rate for the stream may be measured by the time required to start encoding after the device fails, such as by rebooting the failed device or by provisioning a new device to resume encoding. In some instances, the time required resume encoding a stream is dependent on the state of virtual machines in a pool. For example, one or more virtual machines in a pool may be maintained in a "warmed" state, such that the virtual machine is running (e.g., loaded into an operating system) and configured with necessary software to encode content, but is not actually processing content. By having one or more virtual machines in a "warmed" state, downtime required to recover from a failed device can be minimized, as little or no time is required to boot the machine, load an operating system, etc.—instead, the device can simply start to encode content from a point at which a failed device stopped.

In other embodiments, expected failure rates can be measured both with respect to a number of devices encoding content and with respect to a time required to resume encoding after a device failure. For example, expected failure rates may reflect the expected time required to return an encoder pool to producing n copies of a content stream after a device failure.

While high levels of redundancy are generally desirable for content encoding, excessive redundancy is associated with increased computing resources, and thus reduced efficiency of computing systems overall. Put in other terms, while having an input content stream encoded into hundreds of identical outputs may largely eliminate downtime in the case of failure, operating such a system would require large amounts of processing power, memory, network resources, electricity, etc. Such expenditures are typically not warranted for all content streams, particularly those that are in lower demand. While one solution might be to manually configure the redundancy on a stream-by-stream basis, according to demand for the stream, the variability and volatility of demand makes such configuration difficult or impossible. Specifically, because content streams are often widely distributed (e.g., via a global area network) in a real-time manner, it can be difficult or impossible to accurately forecast demand for a given stream. Moreover, the delay caused by manually monitoring a streams popularity and adjusting the level of redundancy of a stream may significantly reduce the efficacy of such adjustments, as demand may vary much more quickly than redundancy could be manually updated. The present disclosure provides an approach to providing a desired level of redundancy according to the demand or popularity of the content stream, thereby increasing the resiliency of popular content streams while reducing the computing resources required to encode less popular content streams.

In some instances, a particular input content, such as a live news feed, may be encoded into multiple output content stream versions (e.g., a low-bandwidth version, a standard definition version, a high definition version, etc.). To manage levels of redundancy in encoder pools, some embodiments of the present disclosure may monitor demand across different versions, and vary the number of devices encoding each version. Illustratively, where a standard definition version has a relatively low demand, the pool management system disclosed herein may reallocate computing devices from encoding the standard definition version to encoding a different version. In some instances, the total number of devices used to encode all versions may remain static during reallocation of devices between versions. In this manner, resiliency can be increased for those versions of a content stream in highest demand, increasing the overall efficiency of the system at the same or similar level of computing resource use.

While aspects of the present disclosure are discussed with relation to encoder pools, content encoding systems may in some instances include additional or alternative pools of computing devices that are used to provide encoded content. For example, content encoding systems may include a pool of content packagers, which operate to package encoded content into a format readable by end user computing devices. Aspects of the present disclosure may additionally or alternatively be used to modify the number and configuration of content packager pools.

In some instances, a content encoding system may configure encoders within an encoder pool to produce identical or seamlessly interchangeable content, such that even if a device producing a content stream fails, a downstream component such as a content packager or end user may obtain an alternative content stream, with little or no perceptible variation in the content stream. To produce identical or seamlessly interchangeable content, encoders within a content stream may use a communications protocol, enabling the encoders to communicate with one another (or a centralized device) to achieve a shared encoding state. Systems and methods for implementing such a communications protocol among a pool of encoders are described in U.S. patent application Ser. No. 15/194,347, filed Jun. 27, 2016, and entitled SYNCHRONIZATION OF MULTIPLE ENCODERS FOR STREAMING CONTENT," (the '347 application), the entirety of which is incorporate by reference herein.

As will be appreciated by one of skill in the art in light of the present disclosure, the embodiments disclosed herein improves the ability of computing systems, such as content streaming systems, to deliver content to users in a resilient and/or cooperative manner. Specifically, aspects of the present disclosure improve the ability of content streaming systems to provide redundant or cooperative encoding to an extent appropriate for a content stream, while minimizing inefficiencies created by over-use of redundant encoding systems. Moreover, the presently disclosed embodiments address technical problems inherent within computing systems; specifically, the unreliability of non-redundant systems, the limited ability of a single device to encode content according to a variety of formats or parameters, the inefficiencies of redundancy systems for low demand content, and the impossibility or impracticality of manually altering redundancy based on demand levels. These technical problems are addressed by the various technical solutions described herein, including the use of a pool manager to monitor consumption of a content stream by end users, and to vary the number or configuration of encoding devices according to the demand, to reach an appropriate level of redundancy. Thus, the present disclosure represents an improvement on existing content streaming systems and computing systems in general.

The foregoing aspects and many of the attendant advantages of the present disclosure will become more readily appreciated as the same become better understood by reference to the following, when taken in conjunction with the accompanying drawings.

FIG. 1 is a block diagram depicting an illustrative logical network environment 100 including multiple content output devices 102, content providers 104, and content distribution systems 120 in communication with a streaming content delivery system 110 via a network 106. While the content output devices 102, the content providers 104, and the content distribution systems 120 are shown as grouped within FIG. 1, the content output devices 102, content providers 104, and content distribution systems 120 may be geographically distant, and independently owned or operated. For example, the content output devices 102 could represent a multitude of devices in various global, continental, or regional locations accessing the content streaming system 110. Further, the content providers 104 could represent a multitude of related or distinct parties that have associated with the content streaming system 110 to provide streaming content to the content output devices 102. Still further, the content distribution systems 120 could represent a multitude of related or distinct parties enabling distribution of content from the content streaming system 110 to the content output devices 102. While shown as distinct, any one or more of the content streaming system 110, content output devices 102, content providers 104, or content distribution systems 120 may be operated by a common entity, or by a common computing device. Similarly, each of the components of the content streaming system 110 may be located within geographically diverse areas. For example, while shown as a collection, the content encoders 114 may in some instances include devices in a number of geographic regions (e.g., corresponding to cities, states, countries, continents, etc.), and thus Accordingly, the groupings of content output devices 102, content providers 104, content streaming system 110, and content distribution systems 120 within FIG. 1 is intended to represent a logical, rather than physical, grouping.

Network 106 may be any wired network, wireless network, or combination thereof. In some instances, network 106 may be a telecommunications network, such as a personal area network, local area network, wide area network, cable network, satellite network, cellular telephone network, or combination thereof operating via the internet protocol (IP). In other instances, the network 106 may be or may include other network types, such as television networks or radio networks. In the example environment of FIG. 1, network 106 is a global area network (GAN), such as the Internet. Protocols and components for communicating via the other aforementioned types of networks are well known to those skilled in the art of electronic communications and thus, need not be described in more detail herein. While each of the content output devices 102, content providers 104, content distribution systems 120, and content streaming system 110 is depicted as having a single connection to the network 106, individual components of the content output devices 102, content providers 104, content distribution systems 120, and content streaming system 110 may be connected to the network 106 at disparate points. Accordingly, communication times and capabilities may vary between the components of FIG. 1. While shown in FIG. 1 as a single network, the network 106 may represent different networks interconnecting the different components of FIG. 1. For example, the network 106 may represent a first network (e.g., the Internet) that interconnects the content streaming system 110 and the content distribution systems 120, and a second network (e.g., a television broadcasting network) that interconnects the content distribution system 120 and the content output devices 102.

Content output devices 102 may include any number of different devices configured to output content from the content streaming system 100 (e.g., directly or via the content distribution systems 120). For example, individual content output devices 102 may correspond to computing devices, such as a laptop or tablet computer, personal computer, wearable computer, server, personal digital assistant (PDA), hybrid PDA/mobile phone, mobile phone, electronic book reader, set-top box, camera, digital media player, and the like. As a further example, individual content output devices 102 may correspond to televisions, radios, or other output devices (e.g., which may or may not include or correspond to computing devices). Each content output device 102 may include hardware and/or software enabling the reception and output of streaming content, including dedicated playback hardware, dedicated software (e.g., specially programmed applications), and general purpose software (e.g., web browsers) capable of outputting streaming content (e.g., by downloading the content directly, downloading a web page including the content, etc.).

Content providers 104 may include any computing device owned or operated by an entity that provides content to the content streaming system 110 for subsequent transmission to content output devices 102. For example, content providers 104 may include servers hosting streaming audio or video, or may include recording devices transmitting content to the content streaming system 110 (e.g., digital video recorders).

Content distribution systems 120 can include any computing device owned or operated by an entity that assists in delivery of content from the content streaming system 110 to the content output devices 102. Illustratively, the content distribution systems 120 may include network-based content delivery networks ("CDNs") that provide a geographically-diverse set of points of presence ("POPs") from which content output devices 102 may obtain and output content. As a further illustration, the content distribution systems 120 may include distribution points in traditional networks, such as a television station, cable provider station, radio station, etc.

The content streaming system 110 can include a variety of components and devices configured to process streaming content obtained from a content provider and make processed content available to the content output devices 102 and/or the content distribution systems 120. Specifically, the content streaming system 110 can include a content ingestor 111 configured to obtain a stream of content (e.g., live content) from a content provider 104, and to provide that content to a pool 112 of content encoders 114 for encoding. The content provided to the content ingestor 111 may be in "raw," uncompressed or analog format, or in a format that is otherwise required to be "encoded" prior to delivery to the content output devices 102. Accordingly, the content ingestor 111 may pass the stream of content onto one or more content encoders 114, which can encode the content into one or more formats accepted by the content distribution systems 120 or the content output devices 102. While the term "encode" is used herein to discuss the processing of the content encoders 114, use of this term is not intended to limit that processing to conversion of analog to digital formats. Rather, the content encoders 114 may in some instances process digital content to convert that digital content into another digital format (sometimes referred to as "transcoding"), and the term "encode" is intended to encompass to such conversions. As discussed above, in order to provide redundant or cooperative encoding of content (e.g., to provide resiliency or adaptive-quality streaming), multiple content encoders 114 may be configured to encode the stream of content received from the content ingestor 111 according to the same or to interchangeable parameters.

After encoding the content, each content encoder 114 may provide the encoded content to a pool 118 of content packagers 116, which may package the content into a container format accepted by the content distribution systems 120 and/or content output devices 102. The content packagers 116 can then distribute the content to the content distribution systems 120, which may in turn distribute the content to content output devices 102 for decoding and output (e.g., display). Additionally or alternatively, the content streaming system 110 may distribute the content directly to the content output devices 102.

In accordance with the present disclosure, the content streaming system 110 further includes a pool manager 119, which can include a computing device configured with computer-executable instructions to manage the configuration of the encoder pool 112 or the packager pool 118, such as by alternating the number of devices within the encoder pool or altering the state of such device (e.g., as in a fully operational state, encoding content, or as in a warmed state, loaded and ready but not yet encoding content). As will be described below, the pool manager 119 can operate to obtain information regarding demand for a content stream (or a version of a content stream) from content output devices 102 or content distribution systems 120, and to vary the configuration of the encoder pool 112 or packager pool 118 based on that information. For example, the pool manager 119 can modify the encoder pool 112 to increase redundancy and resiliency for high demand content streams, while reducing redundancy or resiliency for low demand content streams (e.g., to reduce the computing resources used for such low demand streams). As a further example, the pool manager 119 may use demand information for a content stream to modify an arrangement or location of content encoders 112 within an encoder pool 114 or content packagers 116 within a packager pool 118, such that encoders 112 or packagers 116 are instantiated in a location nearby (either in terms of physical or network distance) to content output devices 102 or devices of content distribution systems 120 receiving encoded content. As yet another example, the pool manager 119 may utilize demand information to vary the configuration of individual devices within an encoder pool 112 or packager pool 118. For example, where such devices are implemented as virtual machines, the pool manager 119 may alter the amount of host computing resources (e.g., processing power, memory, network bandwidth, etc.) available to the virtual machine.

In some instances, a pool manager 119 may modify an encoder pool 112 or packager pool 118 (or devices within the respective pools 112 and 118) according to additional or alternative criteria. For example, the pool manager 119 may modify a number or configuration of devices within an encoder pool 112 or packager pool 118 based on a forecasted demand during a given time (e.g., increasing the number of devices in an encoder pool 112 or packager pool 118 during peak viewing hours, decreasing the number of devices during other hours). As an additional example, the pool manager 119 may modify a location of devices within an encoder pool 112 or packager pool 118 to locate those devices nearby to output devices 102 or devices of content distribution systems 120 that are expected to experience higher demand (e.g., to locate devices within the encoder pool 112 or packager pool 118 within a time zone during peak viewing periods for that time zone).

Figure 2:
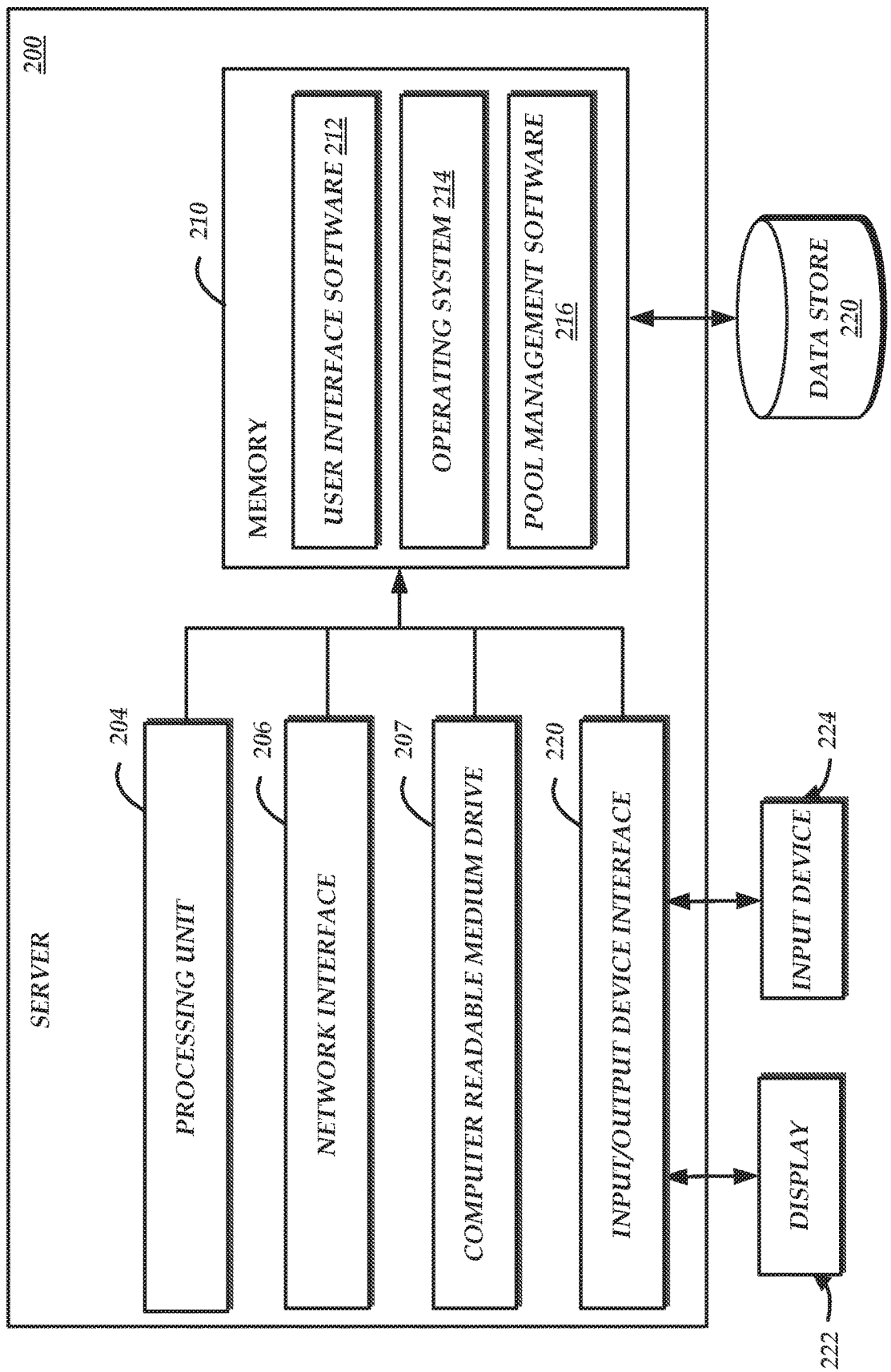
FIG. 2 is a block diagram depicting an illustrative configuration of one embodiment of a server than may implement the pool manager within the content streaming system of FIG. 1.

It will be appreciated by those skilled in the art that the content streaming system 110 may have fewer or greater components than are illustrated in FIG. 1. In addition, the content streaming system 110 could include various web services or peer-to-peer network configurations. Thus, the depiction of the content streaming system 110 in FIG. 1 should be taken as illustrative. In some embodiments, components of the content streaming system 110, such as the content ingestor 111, the content encoders 114, the content packagers 116, and the pool manager 119 may be executed by one or more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment. In other embodiments, components of the content streaming system 110, such as the content ingestor 111, the content encoders 114, the content packagers 116, and the pool manager 119 may be implemented within an environment of a content provider 104 (e.g., on the premises of a content provider 104). In instances where the content streaming system provides multiple versions of a content stream, logical groupings of the encoder pool 112 or packager pool 118 may vary. For example, the content streaming system 110 may include multiple distinct pools for each content version output, or may include a single pool outputting each content version. While embodiments are described with respect to a single content stream (which may be output in multiple versions), the content streaming system 110 and the components shown therein may be configured to process multiple content streams. Thus, the configuration shown within FIG. 1 is intended to be illustrative, and not limiting FIG. 2 depicts one embodiment of an architecture of a server 200 that may implement the pool manager 119 described herein. The general architecture of server 200 depicted in FIG. 2 includes an arrangement of computer hardware and software components that may be used to implement aspects of the present disclosure. As illustrated, the server 200 includes a processing unit 204, a network interface 206, a computer readable medium drive 207, an input/output device interface 220, a display 222, and an input device 224, all of which may communicate with one another by way of a communication bus. The network interface 206 may provide connectivity to one or more networks or computing systems, such as the network 106 of FIG. 1. The processing unit 204 may thus receive information and instructions from other computing systems or services via a network. The processing unit 204 may also communicate to and from memory 210 and further provide output information for an optional display 222 via the input/output device interface 220. The input/output device interface 220 may also accept input from the optional input device 224, such as a keyboard, mouse, digital pen, etc. In some embodiments, the server 200 may include more (or fewer) components than those shown in FIG. 2. For example, some embodiments of the server 200 may omit the display 222 and input device 224, while providing input/output capabilities through one or more alternative communication channel (e.g., via the network interface 206).

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the server 200. The memory 210 may further include computer program instructions and other information for implementing aspects of the present disclosure. For example, in one embodiment, the memory 210 includes user interface software 212 that generates user interfaces (and/or instructions therefor) for display upon a computing device, e.g., via a navigation interface such as a web browser installed on the computing device. In addition, memory 210 may include or communicate with one or more auxiliary data stores, such as data store 120, which may correspond to any persistent or substantially persistent data storage, such as a hard drive (HDD), a solid state drive (SDD), network attached storage (NAS), a tape drive, or any combination thereof.

In addition to the user interface module 212, the memory 210 may include pool management software 216 that may be executed by the processing unit 204. In one embodiment, the pool management software 216 implements various aspects of the present disclosure, e.g., managing the number and configuration of computing devices within encoder pools or packager pools. While the content encoder software 216 is shown in FIG. 2 as part of the server 200, in other embodiments, all or a portion of the software may be implemented by alternative computing devices within the content streaming system 110, such as virtual computing devices within a hosted computing environment. Moreover, while FIG. 2 is described with respect to a pool manager 119, the software within the memory 210 may additionally or alternatively include instructions to implement other components of the present disclosure, such as the content encoders 113.

Figure 3A:
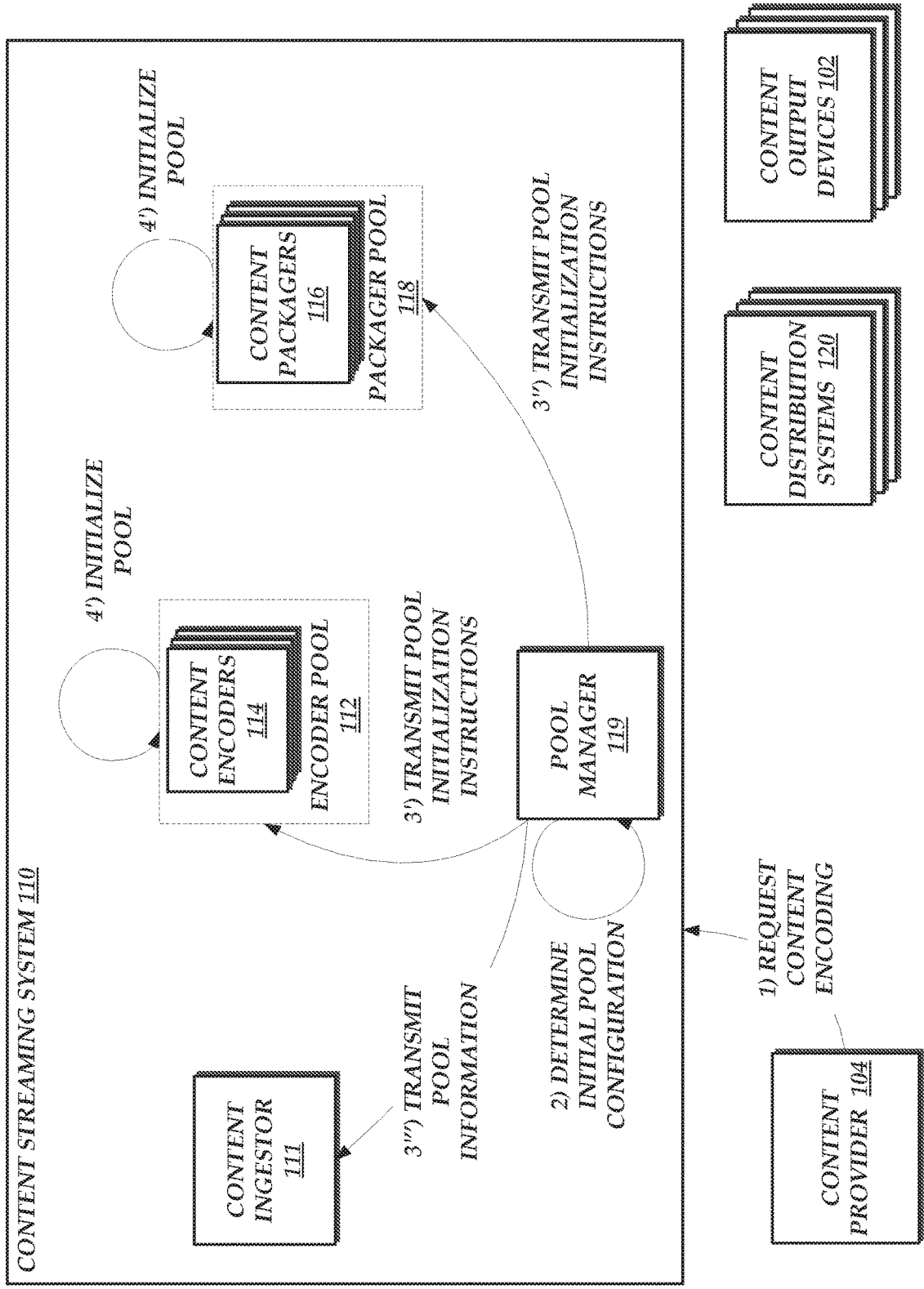
FIGS. 3A-3C are block diagrams depicting illustrative interactions of the content streaming system of FIG. 1 to modify configurations of an encoder pool and packager pool based on consumption information regarding content encoded at the encoder pool.
Figure 3B:
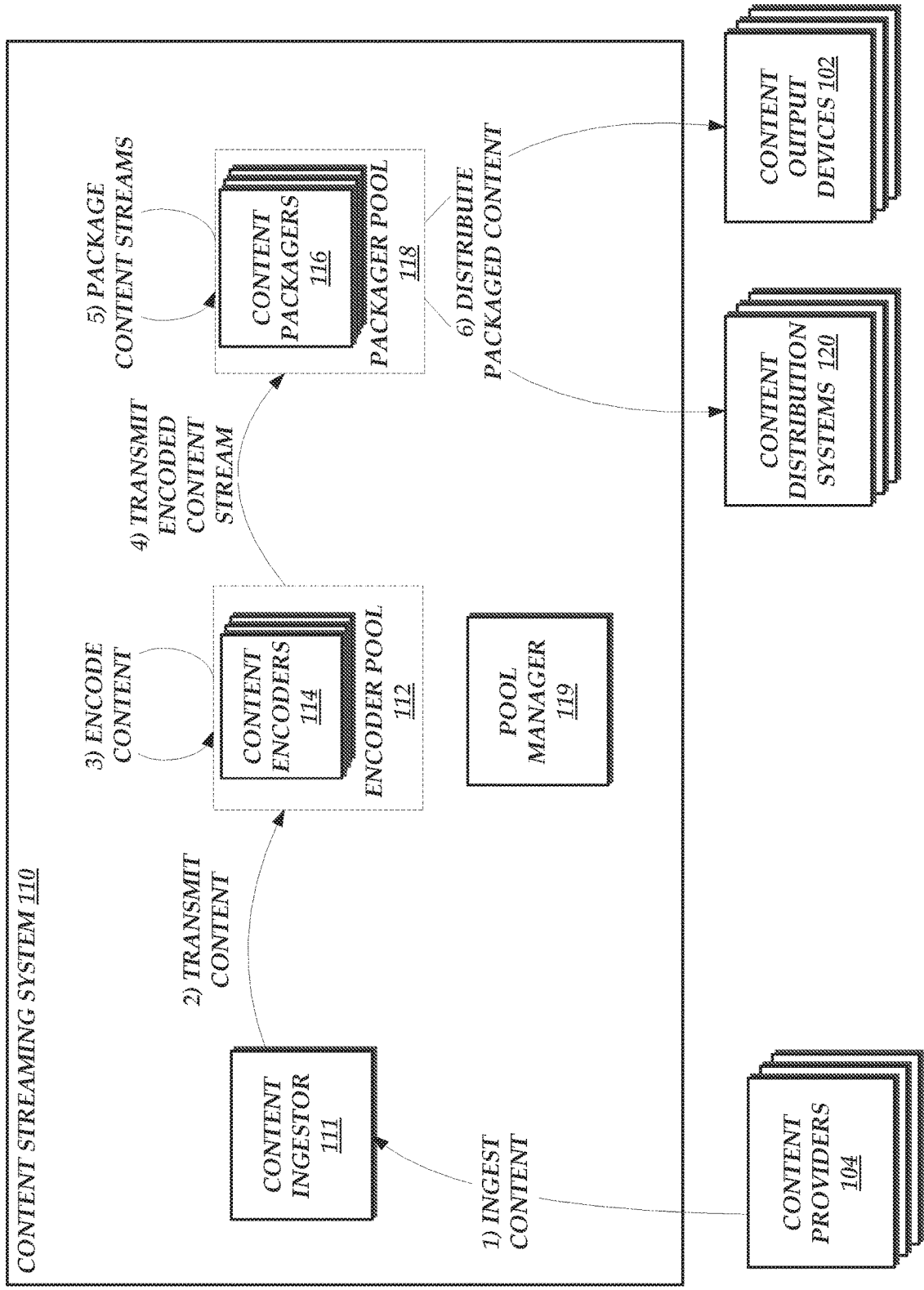
Figure 3C:
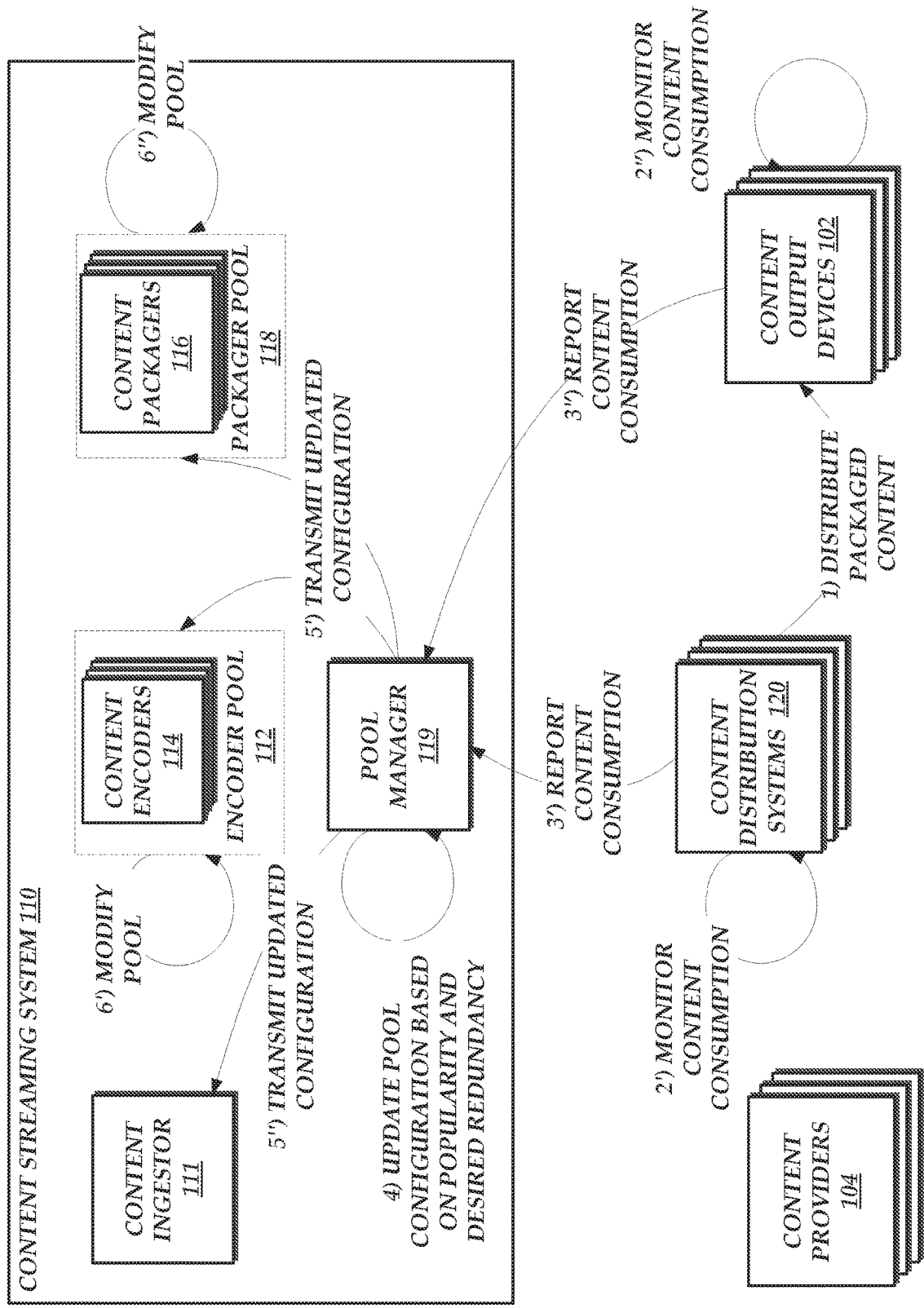

With reference to FIGS. 3A through 3C, a set of illustrative interactions for demand-based management of an encoder pool 112 and packager pool 112 will be described. As will be described below, the interactions of FIGS. 3A through 3C enable the number and configuration of devices within the encoder pool 112 and packager pool 112 to be altered based on a monitored demand for an output content stream. Illustratively, the various encoders 114 of the encoder pool 112 may provide enable either redundant or distributed content encoding within the content streaming system 110. For example, a first portion of the encoders 114 may be configured to encode content according to a first set of parameters (e.g., at 4K resolution and 60 frames per second), while a second portion of the encoders 114 are configured to encode the same content according to a second set of parameters (e.g., at 1080p resolution and 30 frames per second). In some embodiments, an individual encoder 114 may be configured to encode multiple versions (or "renditions") of content. For example, the second portion of the encoders 114 may, in addition to encoding the content according to the second set of parameters, also be configured to each encode the content according to a third set of parameters (e.g., at 480i resolution and 30 frames per second). Thus, any combination of encoders may be used to encode any combination of versions of a content item, with each encoder providing one or more redundant or cooperative encoded content streams.

In such an arrangement, it is sometimes desirable within the content streaming system 110 to configure the encoder pool 112 and the packager pool 118 to provide some level of redundancy, such that failure of one or more devices in a respective pool causes little or no perceptible failure in an output content stream to end users. However, increased redundancy is generally associated with increased computing resource usage (and thus, increased costs, environmental impact, wear and tear, etc.). Accordingly, the interactions of FIGS. 3A through 3C can enable the redundancy of the pools 112 and 118 to vary according to the demand for the output content stream (or versions thereof), as can be monitored via the content distribution systems 120, the content output devices 102, or at the content streaming system 110 itself. In one embodiment, the redundancy of a pool can be measured according to a ratio of "hot" devices (those actively encoding content) to "warm" devices (those prepared to encode content, but not yet actively encoding content), as well as according to the total number of devices in a pool (as distributed according to the ratio). Further, the interactions of FIG. 3A through 3C can enable other alterations to the configuration of pools 112 and 118, such as changes in the locations of various encoders 112 or packagers 116 within the pools 112 and 118. Illustratively, where demand for a content stream is high in a first geographic region, but low in a second geographic region, the configuration of the pools 112 and 118 may be altered such that the devices of the pools 112 and 118 are divided in location between the first and second region based on demand in those regions. As a further illustration, where devices of the pools 112 and 118 are located in a first geographic region with low demand for a content stream, but a second geographic region has relatively high demand for the content stream, the devices of the pools 112 and 118 may be least partially transferred to the second geographic region. Additionally or alternatively, devices within the first geographic region may be shut down, while new devices in the second geographic region are started.

In instances where demand is used to modify a number of devices within either or both pools 112 and 118, the content streaming system 110 may a designate different number or ratio of devices for a number of "tiers" of demand, which can be defined according to an absolute number of end users with active sessions for viewing or outputting content. Illustratively, content streams with under ten thousand end users may be categorized as low demand, content streams with between ten thousand and one hundred thousand end users may be categorized as medium demand, content streams with between one hundred thousand and one million end users may be categorized as high demand, and content streams with over one million end users may be categorized as extreme demand. In one embodiment, higher tiers of demand may be associated with a higher absolute number of devices, as well as a higher proportion of "warmed" devices to "hot" devices. In this manner, failures of devices under higher demand are less likely to impact an output content stream, because output of the failed device can be recovered using interchangeable output of another device, and the failed device can be quickly replaced with a warmed device. Conversely, failures of devices under lower demand may be more likely to cause substantial impact to the content stream; however, this risk may be offset by the relatively low impact to end users overall as well as the reduced computing resource usage in the content streaming system 110. In some embodiments, rather than using tiers of demand, a number or ratio of devices in a pool may be directly proportional to a number of end users (e.g., one hot device for every ten thousand users, one warm device for every hundred thousand users), or may correspond to the number of end users according to an algorithm defined by the content streaming system 110 or a content provider 104.

The interactions of FIG. 3A begin at (1), where a content provider 104 transmits a request to the content streaming system 110 to encode content. The request may be transmitted, for example, via an application programming interface (API) or user interface (e.g., a graphical user interface, or GUI) provided by the content streaming system 110. In some instances, the request may include information designating how end user demand for a content stream should be measured (e.g., tier definitions), as well as information designating how measurements of end user demand should be correlated to the number or ratio of devices in a pool. In other instances, this information may be provided by the content provider 104 separately, or may be provided by the content streaming system 110 (e.g., using default values). In some instances, the request may also include an expected demand for a content stream, which may be utilized to determine an initial configuration of pools.

At (2), the pool manager 119 determines the initial configuration for the encoder pool 112 and packager pool 118. In one embodiment, the pool manager 119 can utilize the information from the request, such as the expected demand and the information for mapping expected demand to a number and configuration of instances, to determine the number and configuration of instances in the encoder pool 112 and packager pool 118. In other instances, the pool manager 119 may determine the initial number and configuration of instances in the encoder pool 112 and packager pool 118 according to default values (e.g., with respect to either or both expected demand and correlation of that demand to resiliency of the pool). In still other instances, the pool manager 119 may determine the initial number and configuration of instances in the encoder pool 112 and packager pool 118 according to predicted values, such as based on prior demand data for similar content streams (e.g., streams within the same series of content, streams by the same author, director, producer, network, etc.).

Thereafter, at (3') and (3"), the pool manager 119 transmits initialization instructions to the encoder pool 112 and the packager pool 118, respectively. These instructions may include, for example, a number of devices to be included in the respective pools, and whether such devices should be configured as hot or warm. In some instances, the instructions further include a desired location or locations of the devices within the pools 112 and 118. In other instances, locations of the pools 112 and 118 may be determined, for example, by transmission of the instructions to pools 112 and 118 within the desired location (e.g., where different pools 112 and 118 are implemented in various regions). Additionally, at (3"), the pool manager 119 transmits pool information to the content ingestor 111. This information may include, for example, the location (e.g., network address or other identifier) of the pool 112, or devices within the pools 112, such that the content ingestor 111 can transmit content to the pools 112 for encoding and packaging. The pool manager 119 can similarly notify the encoder pool 112 (e.g., within the initialization instructions) of a location or identifier of the packager pool 118. At (4') and (4"), the respective pools are initialized in accordance with the instructions. Illustratively, one or more host devices (not shown in FIG. 3A) may obtain the instructions from the pool manager 119, and initiate execution of virtual machines executing an operating system and software to encode or package a content stream.

With reference to FIG. 3B, interactions for utilizing an encoder pool 112 and packager pool 118 to encode a content stream and distribute the stream to end users via content distribution systems 120 or content output devices 102 will be described. Illustratively, the interactions of FIG. 3B may occur subsequently to those described above with respect to FIG. 3A, utilizing a previously initialized encoder pool 112 and packager pool 118.

The interactions of FIG. 3B begin at (1), where the content ingestor 111 receives content from a content provider 104. Illustratively, the content ingestor 111 may receive content from content providers 104 over the network 106 (e.g., via a user datagram protocol, or "UDP," stream). In other embodiments, the content ingest 111 may receive content directly from a capture device (e.g., a digital video recorder connected to the content ingestor 111 via a serial digital interface ("SDI")). As noted above, the content provided to the content ingestor 111 may be in "raw," uncompressed or analog format, or in a format that is otherwise required to be "encoded" prior to delivery to the content output devices 102. Thus, at (2), the content ingestor 111 passes the content as a stream to the encoders 114 of the encoder pool 112, which begin encoding content at (3). Illustratively, the encoders 114 may encode the obtained content into any number of known formats, including but not limited to H.263, H.264, H.265, MICROSOFT SMPTE 421M (also known as VC-1), APPLE™ ProRes, APPLE Intermediate Codec, VP3 through 9, Motion JPEG ("M-JPEG"), MPEG-2 part 2, RealVideo, Dirac, Theora, and MPEG-4 Part 2 (for video), and Vorbis, Opus, MP3, advanced audio coding ("AAC"), pulse-code modulation ("PCM"), dedicated to sound ("DTS"), MPEG-1, audio coding 3 ("AC-3"), free lossless audio codec ("FLAC"), and RealAudio (for audio), or combinations thereof. Various techniques for encoding content are known within the art, and therefore will not be described in greater detail herein. While it is assumed for the purposes of description of FIG. 3B that each of the encoders 114 begin encoding the content stream at the same time, this is not required. Rather, where an encoder 114 begins encoding at a later point in time than other encoders 114, that encoder 114 may establish synchronization with the other encoders 114, such as via the mechanisms described in the '347 application.

After encoding content, the encoded content is transmitted to the packager pool 118 at (4). Thereafter, at (5), the content packagers 116 within the packager pool 118 may package the content into a container format accepted by the content distribution systems 120 and/or content output devices 102. As will be recognized by one of skill in the art, a container format may generally combine encoded audio and video into a file, potentially along with synchronization information for the audio and video, subtitles, metadata, or other information. Examples of containers include, but are not limited to, Matroska, FLV, MPEG-4 Part 12, VOB, Ogg, Audio Video Interleave ("AVI"), Quicktime, Advanced Systems Format ("ASF"), RealMedia, and MPEG Transport Stream ("MPEG-TS"). In some instances, containers may include exclusively audio or exclusively video, rather than a combination of the two. In one embodiment, content packagers 116 may package the content into multiple container files, such as multiple transport stream files, and generate additional information enabling distribution systems 120 and/or content output devices 102 to distribute or consume the packaged content. For example, the content packagers 116 may package the encoded content according to streaming protocols, such as Hypertext Transport Protocol ("HTTP") Live Streaming ("HLS") or MPEG Dynamic Adaptive Streaming over HTTP ("MPEG-DASH"), and generate metadata regarding the encoded content, such as manifest file identifying each package of encoded content.

After packaging the encoded content, the content packagers 116, at (6), distribute the content to one or more of the content output devices 102 and the content distribution systems 120 (which may in turn distribute the content to content output devices 102 for decoding and output) for display or output to end users.

With reference to FIG. 3C, interactions for modifying the number or configuration of devices within an encoder pool 112 and packager pool 118 based on demand from end users will be described. Illustratively, the interactions of FIG. 3C may occur subsequently to those described above with respect to FIG. 3B, to modify the number or configuration of device within a previously initialized encoder pool 112 and packager pool 118.

The interactions of FIG. 3C begin at (1), where the content distribution system 120 distributes encoded and packaged content to content output devices 102. Thereafter, either or both of the content distribution systems 120 and the content output devices 102 monitor consumption of the content, at (2') and (2"), respectively. Illustratively, the content distribution system 120 may monitor consumption of content by determining a number of unique content output devices 102 to which content is transmitted within a threshold period of time. For example, the content distribution system 120 may monitor consumption of content by determining the number of network addresses (e.g., internet protocol or IP addresses) to which content is transmitted, or by determining a number of user accounts associated with the content output devices 102 to which content is transmitted. Additionally or alternatively, the content output devices 102 may monitor output of a content stream. For example, a media player on the content output device 102 may be configured to determine when a content stream is output by the device 102, and transmit an indication of that output to the content distribution systems 120 or the pool manager 119. In some instances, monitoring of content output on a content output device 102 may occur via computer-executable instructions provided in conjunction with the content stream, such as JAVASCRIPT™ instructions provided along with the content stream and executed on the content output device 102. While logically grouped in FIG. 3C, the content output devices 102 may include devices that obtain content directly from the content streaming system 110 as well as those device that obtain content from the content distribution systems 120. Moreover, it is contemplated not all content output devices 102 would necessarily be configured to monitor content consumption. However, at least a portion of such consumption may be monitored by the content distribution systems 120. In some instances, the content streaming system 110 may be configured to adjust for unreported content consumption (e.g., by altering the monitored demand to account for expected unreported consumption, by altering the redundancy associated with demand based on monitored consumption, etc.).

Thereafter, at (3') and (3"), the content distribution systems 120 and content output devices 102 report content consumption information to the pool manager 119. The pool manager 119, at (4), then updates the configuration of the encoder pool 112 and packager pool 118 based on the apparent popularity of the content stream (as reflected in consumption information) and a desired redundancy. While not shown in FIG. 3C, the pool manager 119 may in some instances be configured to deduplicate the obtained content consumption information to adjust for duplication that may occur when an individual output of a content stream is reflected in both information from a content output device 102 and a content distribution system 120. For example, the pool manager 119 may omit duplicative information indicating that the same user account or network address has output a content stream.

As noted above, different popularities of a content stream can be associated with different numbers and configurations of devices within either or both of the encoder pools 112 and packager pools 118. For example, different popularities of a content stream may be described as "tiers" of popularity, based on a number of end users that output the stream. Each tier may be associated with a number of devices in a respective pool, as well as a ratio of hot to warm devices. As a further example, a number of hot or warm devices may be determined based on an algorithm linking numbers of end users with respective numbers of hot or warm devices. The correlations between end user demand and number or configuration of devices may be provided by a content provider 104 of the content stream or the content streaming system 110. Accordingly, at (4), the pool manager 119 can update the configuration of the encoder pool 112 and the packager pool 118 as needed to adjust the number and configuration of devices within the respective pools to an appropriate value. Thereafter, at (5'), the pool manager 119 can transmit updated configuration information (if necessary) to either or both of the encoder pool 112 and packager pool 118. The respective pools 112 and 118 can then modify the number or configuration of devices within the pools 112 and 118. Such modifications may include, for example, deconstructing or shutting down one or more virtual machines within the pools, or causing a virtual machine to halt processing of a content stream while maintaining a ready (warmed) state to resume processing. Such modifications may further include adding devices into the pool 112, such as by loading a new virtual machine to processes a content stream or maintain a ready (warmed) state. Further, such modifications may include causing previously warmed devices to begin encoding or packaging a content stream. Still further, such modifications may include varying configurations of individual devices within the pools 112 and 118, such as by varying an individual virtual machine instances access to computing resources of a host device. In some instances, such modifications may include altering a location of devices within the pools 112 and 118 (e.g., by migrating the devices or by shutting down devices in a first location and booting devices in a second location). In some instances, modifications to an encoder pool 112 may require synchronization of the encoders 114 within the pool, to ensure that output content is seamlessly interchangeable. The encoders 114 may therefore utilize a synchronization protocol, such as that described in the '347 application, to maintain synchronization within the encoder pool 112. In addition, at (5"), the pool manager 119 can transmit updated configuration information to the content ingestor 111, as necessary, in order to inform the content ingestor 111 of any changes within the encoder pool 112. For example, the pool manager 119 may transmit updated network address information for devices within the pool 112 to the content ingestor 111, in order to enable the content ingestor 111 to transmit content for encoding to the devices. Thus, the number and configuration of devices in the encoder pool 112 and the packager pool 118 can be dynamically adjusted according to a monitored consumption by end users.

Figure 4:
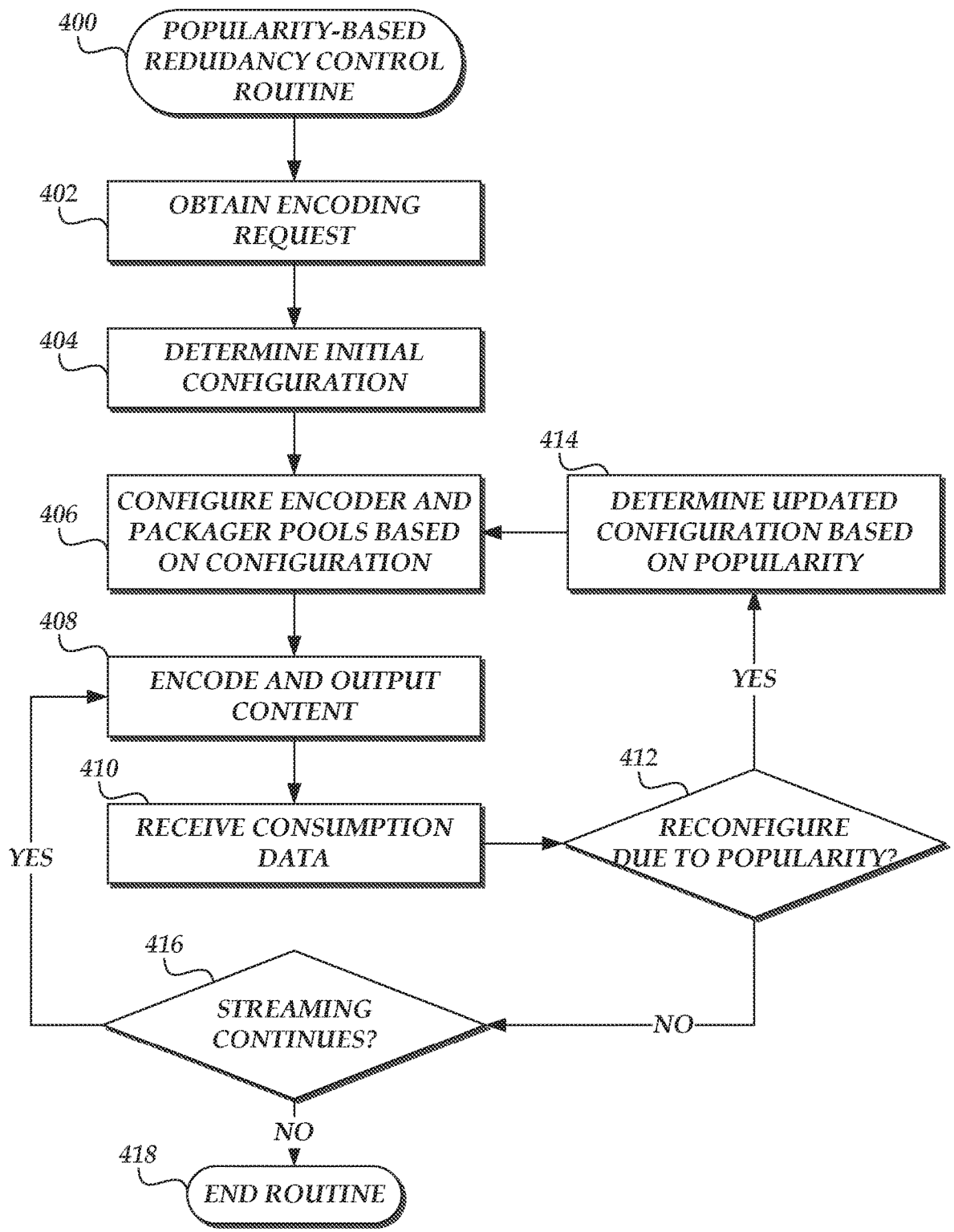
FIG. 4 is a flow chart depicting an illustrative routine for managing an encoder and packager pool based on consumption information regarding content encoded at the encoder pool.

While the interactions of FIGS. 3A through 3C are described above sequentially, it is contemplated that some or all of the interactions may repeatedly occur, and that these interactions may occur at least in part concurrently. For example, the interactions of FIG. 3C may be followed by those of FIG. 3B, and this sequence may be repeated while content is streamed to content output devices 102. Thus, the interactions of FIG. 3A through 3C can implement a continuous feedback loop, dynamically adjusting the size and configuration of the encoder and packager pools 112 and 118 according to end user demand, thereby adjusting the resiliency of the respective pools 112 and 118 in accordance with their popularity, while reducing the inefficiencies caused by implementing excessive resiliency for low popularity streams. Moreover, while the interactions of FIGS. 3A through 3C are described with respect to illustrative examples of how encoder pools 112 or packager pools 118 may be modified according to various criteria, additional or alternative criteria are contemplated within the present disclosure. For example, while the number, location, or configuration of devices within an encoder pool 112 or packager pool 118 may be varied based on measured demand, the devices with such pools 112 and 118 may additionally or alternatively be varied based on predicted demand (e.g., due to peak viewing times in a current time zone). With reference to FIG. 4, one illustrative routine 400 is depicted that may be implemented to manage a size and configuration of encoder pools or packager pools based on end user demand. The routine 400 may be implemented, for example, by the pool manager 119 of FIG. 1. The routine 400 begins at block 402, where the pool manager 119 obtains an encoding request from a content provider 104. In some instances, the encoding request may include information for determining a desired number and configuration of encoding devices based on end user demand, such as information designating "tiers" of popularity and desired pool configurations corresponding to the designated tiers. In another instance, the encoding request may request to utilize default values for determining a desired number and configuration of encoding devices based on end user demand. As noted above, in some instances the pool manager 119 may be configured to maintain a static or near-static number of devices within a pool or across pools, while altering the specific content versions output by such devices (e.g., low definition, standard definition, high definition) proportionally to the demand for those versions. Accordingly, a request may include information for proportioning devices between versions based on demand, or request may implicate default values or algorithms for proportioning devices between versions.

At block 404, the pool manager 119 determines an initial configuration of encoding pools or packager pools based on the request. Illustratively, the initial configuration may be based on a default anticipated demand level, a demand level specified by a content provider 104, or a demand level determined based on historical information. The initial configuration may include, for example, a number of devices to include within either or both an encoder pool and packager pool, as well as whether each device should be operated as hot (encoding content) or warm (ready to encode content). The initial configuration may further proportion such devices between different versions of a content, or establish different pools for different versions.

At block 406, the pool manager 119 can transmit instructions to the encoder pool and packager pool (or to one or more devices hosting virtual machines implementing the respective pools) to initialize the pools according to the determined configuration. Thereafter, at block 408, the encoder pool and packager pool can begin encoding content. In some instances, the encoder pool may operate to synchronize encoding, such that output content streams as seamlessly interchangeable and the encoder pool operates in a redundant manner. Embodiments for creation of seamlessly interchanging are described in the '347 application.

At block 410, the pool manager 119 obtains consumption data from either or both content output devices 102 and content distribution systems 120. While not shown in FIG. 4, the pool manager 119 may process the obtained consumption data to more accurately reflect end user consumption, such as by deduplicating the consumption data or adjusting the consumption data to reflect an expected underreporting of content output by end users.

At block 412, the pool manager 119 determines whether the configuration of either or both the encoder pool or the packager pool should be adjusted based on the consumption data, as well as based on information correlating consumption data to an appropriate number or configuration of devices in the encoder pool or packager pool. Illustratively, where consumption data indicates a higher than expected demand or popularity of a content stream, the pool manager 119 can determine, at block 412, that the number of devices within either or both of the encoder or packager pool should be increased, that previously warmed devices should begin encoding content, or that the computing resources available to individual devices within the encoder or packager pool should be increased. Conversely, where consumption data indicates a lower than expected demand or popularity of a content stream, the pool manager 119 can determine, at block 412, that the number of devices within either or both of the encoder or packager pool should be decreased, or that the computing resources available to individual devices within the encoder or packager pool should be decreased. As a further illustration, if demand for a first content version is higher than expected while demand for a second content version is lower than expected, the pool manager 119 may determine, at block 412, that devices previously configured to generate the first content version should be reconfigured to generate the second content version. As yet another illustration, if the demand for a content (or content version) among different regions or locations varies, the configuration of the pools 112 and 118 may be altered to address that variation. In some instances, implementation of block 412 may include consideration of data in addition or alternatively to consumption data, such as expected demand levels for a content based on a current time (e.g., predicted demand during peak viewing times, predicted demand during low viewing times, etc.).

In the instance that no reconfiguration or altering of the encoder pool or packager pool is required, the routine 400 can proceed to block 416. However, if reconfiguration of either the encoder pool or packager pool is required, the routine 400 proceeds to block 414, where the pool manager 119 determines an updated configuration of either or both the encoder pool or the packager pool based on the consumption data, as well as the information correlating consumption data to an appropriate number or configuration of devices in the encoder pool or packager pool. As noted above, an updated configuration may further be based on additional or alternative data, such as expected demand levels for a content based on a current time. The routine 400 then returns to block 406, where the pool manager 119 transmits instructions to the encoder pool or packager pool to configure the pools according to the updated configuration.

The routine 400 then proceeds as described above until reaching block 416, where implementation of the routine 400 varies according to whether a content stream is still being encoded and provided to end users. While the content stream is being encoded, block 416 evaluates as true, and the routine 400 returns to block 408, where it proceeds as described above. When content is no longer encoded, the routine 400 ends at block 418.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method to control redundant content packaging, the computer-implemented method comprising:
   obtaining a mapping of demand information for an output packaged content stream to desired numbers of content packager devices;
   initializing a pool of content packager devices comprising a plurality of content packager devices configured to obtain an encoded content stream and generate a packaged content stream;
   determining, from monitoring information regarding the packaged content stream, a number of content output devices to which the packaged content stream has been transmitted; and
   modifying a number of content packager devices within the pool of content packager devices based on the mapping and the number of content output devices to which the packaged content stream has been transmitted.

2. The computer-implemented method of claim 1, wherein at least one content packager device within the pool of content packager devices is implemented by a virtual machine instance.

3. The computer-implemented method of claim 1, wherein the monitoring information is obtained at least partly from the content output devices.

4. The computer-implemented method of claim 1, wherein the pool of content packages devices is configured to transmit the packaged content stream to the content output devices by use of a content distribution system, and wherein the monitoring information is obtained at least partly from the content distribution system.

5. The computer-implemented method of claim 1 further comprising determining a configuration of the pool of content packager devices, the configuration indicating at least one of a portion of the content packager devices within the pool designated to package the encoded content stream or a portion of the content packager devices within the pool designated to maintain readiness to package the encoded content stream, and wherein modifying the number of content packager devices within the pool further comprises modifying the pool to match the configuration.

6. The computer-implemented method of claim 1, wherein the mapping indicates tiers of potential demands, and wherein modifying the number of content packager devices within the pool of content packager devices comprises modifying the number of content packager devices within the pool of content packager devices to match a number associated with a tier of potential demand, from the tiers of potential demands, corresponding to the number of content output devices to which the packaged content stream has been transmitted.

7. The computer-implemented method of claim 1, wherein the packaged content stream comprises at least first and second packaged content stream versions, and wherein the method further comprises determining a proportion of content packaging devices within the pool to package the packaged content stream version compared to the second packaged content stream version, and modifying the content packaging devices within the pool to match the proportion.

8. A system comprising:
   a physical data store including computer-executable instructions; and
   a processor configured to execute the computer-executable instructions, wherein the computer-executable instructions, when executed, cause the system to:
      obtain a mapping of demand information for an output packaged content stream to desired numbers of content packager devices;
      initialize a pool of content packager devices comprising a plurality of content packager devices configured to obtain an encoded content stream and generate a packaged content stream;
      determine, from monitoring information regarding the packaged content stream, a number of content output devices to which the packaged content stream has been transmitted; and
      modify a number of content packager devices within the pool of content packager devices based on the mapping and the number of content output devices to which the packaged content stream has been transmitted.

9. The system of claim 8, wherein the mapping indicates tiers of potential demand, and wherein the computer-executable instructions cause the system to modify the number of content packager devices within the pool of content packager devices to match a number associated with a tier of potential demand, from the tiers of potential demand, corresponding to the number of content output devices to which the packaged content stream has been transmitted.

10. The system of claim 8, wherein the packaged content stream comprises at least first and second packaged content stream versions, and wherein the computer-executable instructions, when executed, further cause the system to determine a proportion of content packaging devices within the pool to package the first packaged content stream version compared to the second packaged content stream version, and to modify the content packaging devices within the pool to match the proportion.

11. The system of claim 8, wherein the packaged content stream comprises at least one of a single container including the encoded content stream or a plurality of containers collectively including the encoded content stream.

12. The system of claim 8, wherein the computer-executable instructions, when executed, further cause the system to determine a configuration of the pool of content packager devices, the configuration indicating at least one of a portion of the content packager devices within the pool designated to package the encoded content stream or a portion of the content packager devices within the pool designated to maintain readiness to package the encoded content stream, and wherein the computer-executable instructions cause the system to modify the number of content packager devices within the pool to match the configuration.

13. The system of claim 8, wherein the computer-executable instructions, when executed, cause the system to determine the number of content output devices to which the packaged content stream has been transmitted at least partly by identifying a number of unique content output devices identified in the monitoring information.

14. The system of claim 8, wherein the monitoring information is obtained at least partly from the content output devices.

15. Non-transitory computer-readable storage media including computer-executable instructions that, when executed by a computing system, cause the computing system to:
  initialize a pool of content packager devices comprising a plurality of content packager devices configured to obtain an encoded content stream and generate a packaged content stream;
  determine, from monitoring information regarding the packaged content stream, a number of content output devices to which the packaged content stream has been transmitted; and
  modify a number of content packager devices within the pool of content packager devices based on the number of content output devices to which the packaged content stream has been transmitted and information mapping the number of content packager devices to the number of content output devices to which the packaged content stream has been transmitted.

16. The non-transitory computer-readable storage media of claim 15, wherein the information indicates tiers of potential demands, and wherein the computer-executable instructions cause the computing system to modify the number of content packager devices within the pool of content packager devices to match a number associated with a tier of potential demand, from the tiers of potential demands, corresponding to the number of content output devices to which the packaged content stream has been transmitted.

17. The non-transitory computer-readable storage media of claim 15, wherein the packaged content stream comprises at least first and second packaged content stream versions, and wherein the computer-executable instructions, when executed, further cause the computing system to determine a proportion of content packaging devices within the pool to package the packaged content stream version compared to the second packaged content stream version, and to modify the content packaging devices within the pool to match the proportion.

18. The non-transitory computer-readable storage media of claim 15, wherein the computer-executable instructions, when executed, further cause the computing system to determine a configuration of the pool of content packager devices, the configuration indicating at least one of a portion of the content packager devices within the pool designated to package the encoded content stream or a portion of the content packager devices within the pool designated to maintain readiness to package the encoded content stream, and wherein the computer-executable instructions cause the system to modify the number of content packager devices within the pool to match the configuration.

19. The non-transitory computer-readable storage media of claim 15, wherein the pool of content packages devices is configured to transmit the packaged content stream to the content output devices by use of a content distribution system, and wherein the monitoring information is obtained at least partly from the content distribution system.

20. The non-transitory computer-readable storage media of claim 15, wherein the computer-executable instructions, when executed, cause the computing system to determine the number of content output devices to which the packaged content stream has been transmitted at least partly by identifying a number of unique content output devices identified in the monitoring information.

* * * * *